United States Patent [19]

Strojny

[11] 4,327,605
[45] May 4, 1982

[54] MANUAL SHARPENER FOR TEETH OF CHAIN SAWS

[75] Inventor: Werner Strojny, Marienheide, Fed. Rep. of Germany

[73] Assignee: Firma August Ruggeberg, Marienheide, Fed. Rep. of Germany

[21] Appl. No.: 178,162

[22] Filed: Aug. 14, 1980

[30] Foreign Application Priority Data

Aug. 17, 1979 [DE] Fed. Rep. of Germany ....... 2933293

[51] Int. Cl.$^3$ ............................................. B23D 63/16
[52] U.S. Cl. ...................................... 76/25 A; 76/36
[58] Field of Search ..................... 76/25 A, 36, 31, 33; 29/78, 80; 33/202

[56] References Cited

U.S. PATENT DOCUMENTS 2,850,923  9/1958  Gommel ................................. 76/36
3,407,466 10/1968  Granberg ............................... 76/36
3,901,105  8/1975  Ayer ...................................... 76/36
4,010,661  3/1977  Fletcher ................................ 76/36

FOREIGN PATENT DOCUMENTS 1790678  6/1959  Fed. Rep. of Germany .

Primary Examiner—Roscoe V. Parker
Attorney, Agent, or Firm—Browdy and Neimark

[57] ABSTRACT

A sharpener for manual sharpening of the cutting teeth of saw chains for chain saws having a depth limiter disposed in front of the cutter in the cutting direction for controlling the depth of the cut. The cutter is defined by the line passing through a free surface forming the back of the teeth and a cutting face situated on the front of the teeth. A round file is provided for sharpening the cutter by cutting processing of the cutting face. The file is adapted to the tooth front with the cutting face in cross-section. Parallel to the round file, are positioned a guiding rod, which can be placed on the free surface of a cutting tooth to be sharpened, a guiding rod, which can be placed on the free surface of an adjacent cutting tooth, and a second file which can be placed on the depth limiter of the cutting tooth to be sharpened. The two guiding rods, the round file and the second file with respect to each other corresponds to the geometry of the cutting teeth.

13 Claims, 7 Drawing Figures

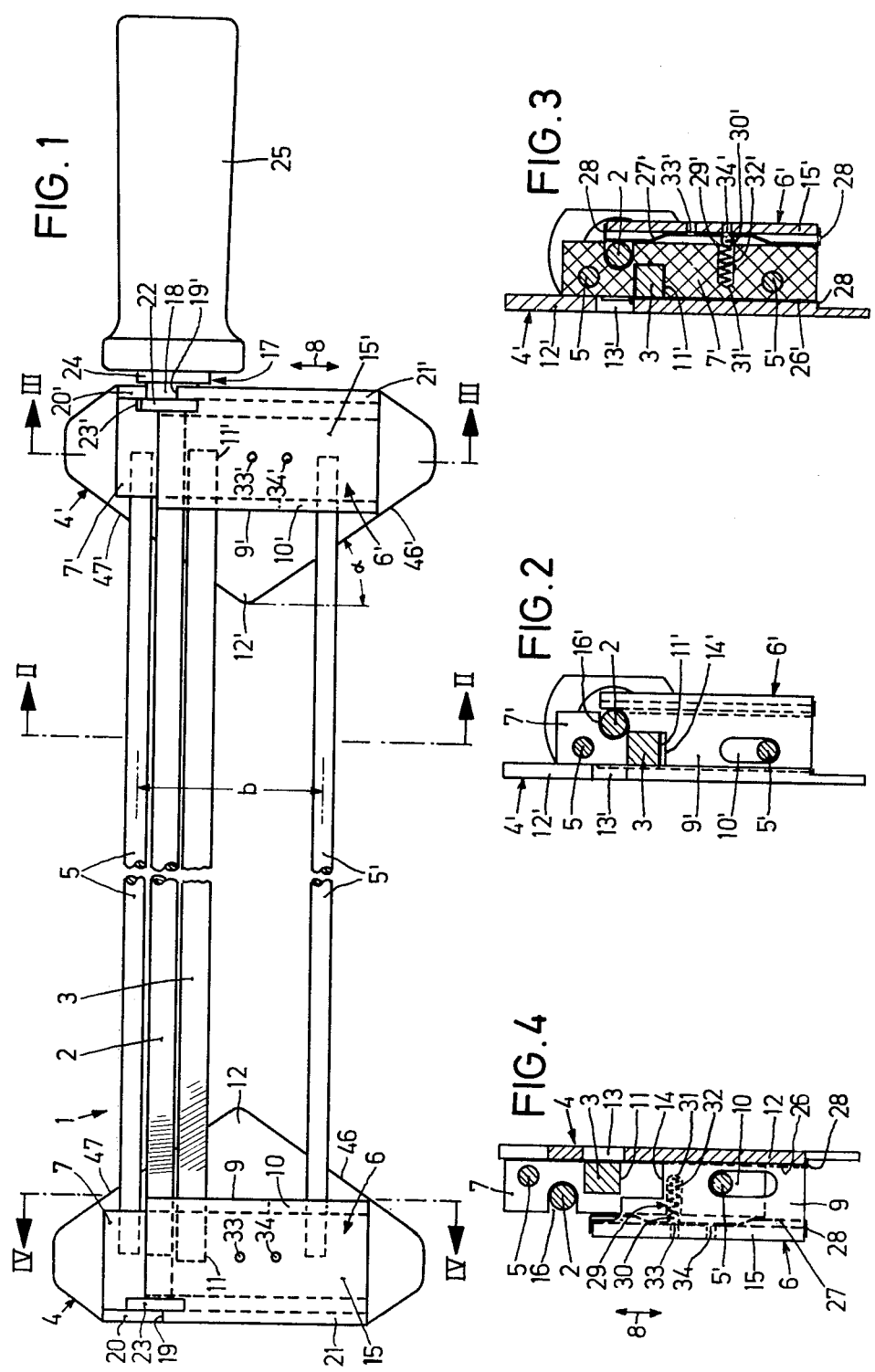

U.S. Patent  May 4, 1982  Sheet 2 of 2  4,327,605

MANUAL SHARPENER FOR TEETH OF CHAIN SAWS

BACKGROUND OF THE INVENTION

This invention relates to a sharpener for manual sharpening of the cutting teeth of saw chains for chain saws. The invention relates more particularly to such a sharpener wherein a depth limiter is disposed in front of the cutter in the cutting direction for controlling the depth of the cut. The cutter is defined by the line passing through a free surface forming the back of the teeth and a cutting face situated on the front of the teeth. A round file is provided for sharpening the cutter by cutting processing of the cutting face, the round file being adapted to the tooth front with the cutting face in cross-section.

For their optimum grinding power to be maintained, chain saws must be sharpened at regular intervals. In the case of chain saws with unsuitably sharpened cutting teeth of the saw chains, the saw chains do not run smoothly, the cutting power decreases and, in extreme cases, the saw chain may even break, which in turn may cause serious accidents. Moreover, the aforesaid disadvantages lead to high wear and failures of the engine driving the chain saw.

Grinding machines such as are used for grinding cutting teeth in the manufacture of saw chains cannot in practice be used in situ. Rather, it is customary, for sharpening cutting teeth, to use round files with a circular cross-section corresponding to the circular segment-shaped cross-section of the tooth front with the cutting face. With such files, the cutting teeth are reworked with the saw chain clamped on to the chain saw. Such saw chains, sharpened manually in situ, are reworked at fairly long intervals by means of stationary grinding devices, in order to restore their cutting geometry; but for this purpose the saw chains have to be removed from the chain saw. There are also automatic resharpening devices whereby the cutting teeth are resharpened with the saw chain clamped to the chain saw, the cutting teeth being conveyed past a manually applicable grinding element in their position on the smallest reversing radius of the driving wheel with a resetting device. However, saw chains thus sharpened display no stable straight cut.

Freehand sharpening of the cutting teeth by means of a round file calls for a high degree of skill on the part of the operator. Moreover, the geometry of the cutters is not maintained in this case.

A sharpening device of the above-mentioned type is known from German Utility Model DE-GM No. 17 90 678, in which a frame, consisting of two parallel guidance rods and two end sections, is movably guided in a clamping rail, the underside of which can be placed on the cutting teeth. Within the frame a round file is disposed movably parallel to the guidance rods, the round file can be swivelled around one of the guidance rods. In place of a round file a flat file can be inserted and used for the re-filing of the depth limiter. The sharpening angle can be pre-set in this known sharpening device by making the proper adjustment between the clamping rail and the guidance rods. The disadvantage in this known sharpening device is the fact that the sharpening of the cutting teeth on the one hand and the re-filing of the depth-limiter have to be made successively. This results in the cutting geometry not being maintained, since it is left up to the skill of the operator how closely the geometry of the delimiter is adjusted to that of the sharpened saw tooth during these successive filing steps.

SUMMARY OF THE INVENTION

The present invention aims to solve the problem of providing a sharpener for manual sharpening of the cutting teeth of saw chains for chain saws wherein the geometry of the cutters is maintained.

The above-mentioned problem is solved by providing a sharpener for manual sharpening of the cutting teeth of saw chains for chain saws, wherein a depth limiter is disposed in front of the cutter in the cutting direction for controlling the depth of the cut and wherein the cutter is formed by the line passing through a free surface forming the back of the teeth and a cutting face situated on the front of the teeth. For sharpening the cutter by cutting processing of the cutting face, a round file is provided, adapted to the tooth front with the cutting face in cross-section. In accordance with the invention, a guiding rod which can be placed on the free surface of a cutting tooth to be sharpened, a guiding rod which can be placed on the free surface of an adjacent cutting tooth and a second file which can be placed on the depth limiter of the cutting tooth to be sharpened are disposed in parallel to the round file. In the arrangement of the two guiding rods, the round file and the second file with respect to each other corresponds to the geometry of the cutting teeth.

By increasing filing away of the tooth front with the cutting face, the cutter changes its position vertically with respect to the direction of cut and progressively approaches the actual saw chain, as the free surface of each cutting tooth displays a free angle with respect to the direction of cut, so that the rear of the tooth defined by the free surface does not grind on the wood to be cut. By the fact that the guiding rods lie upon the free surfaces of two adjacent cutting teeth, the distance between the centers of the guiding rods being equal to the separation of the cutting teeth, the profile of the cutting face and of the tooth front is shifted parallel to the free surface during the sharpening of cutter by the filing of the cutting face and the tooth front. At the same time, the depth limiter is also filed away, so that the depth of cut, i.e. the distance between the cutter and the depth limiter, always remains constant at right angles to the direction of cut.

The two guiding rods can be operatively associated with two end pieces to form a frame and thus render the sharpener extremely stable in itself, which is important for the maintenance and acquisition of the geometry of the cutters.

Mounting the two files on the end-pieces, not only facilitates the replacement of worn out files, but, in particular, it is also possible to cause mirror-symmetrical cutting teeth and those disposed facing each other on the saw chain to cut alternately and always in the correct direction, for which purpose the files are then turned through 180° in the longitudinal direction.

The end-pieces can be advantageously formed as snap-fasteners for the files making it possible to effect the alteration or turning of the files very rapidly and easily, i.e. even under the difficult working conditions prevailing in the presence of cold and/or moisture.

In a particularly advantageous embodiment the end-pieces are respectively provided with housings which guide respective pushers associated with the end of the files, being held fast at one end position and being free at the other end position.

The measure of rotatably mounting the round file ensures that the round file can be fully utilized uniformly on its entire circumference in accordance with an especially good version of the sharpeners of the present invention.

The provision of making the front edges of the end-pieces at an angle with respect to a line drawn at right angles to the longitudinal direction of the guiding rods, the angle being equal to the sharpening angle of the cutting teeth, ensure faultless guiding of the sharpener according to the sharpening angle of each cutting tooth.

BRIEF DESCRIPTION OF THE DRAWINGS

FIG. 1 is a top view of a sharpener according to the invention;

FIG. 2 is a cross-section through the sharpener of FIG. 1 along section line II—II;

FIG. 3 is a cross-section through an end-piece of the file of FIG. 1 in the locked condition, the section being taken along section line III—III;

FIG. 4 is a cross-section through the other end-piece of the sharpener of FIG. 1 in the unlocked condition, the section being taken along section line IV—IV;

DETAILED DESCRIPTION OF THE PREFERRED EMBODIMENT

Figure 5:
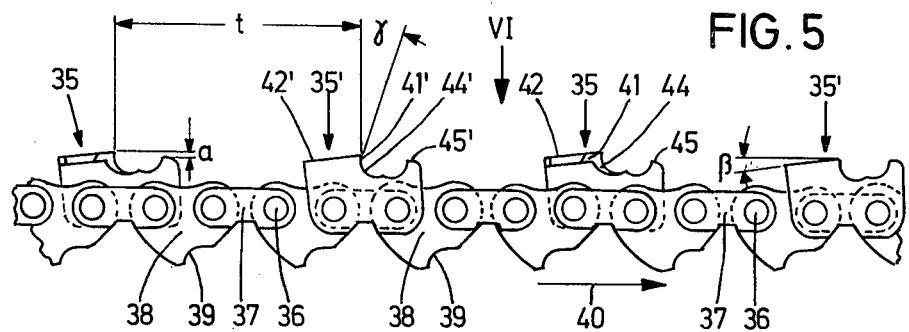
FIG. 5 is a lateral longitudinal view of a part of a saw chain to be sharpened.
Figure 6:
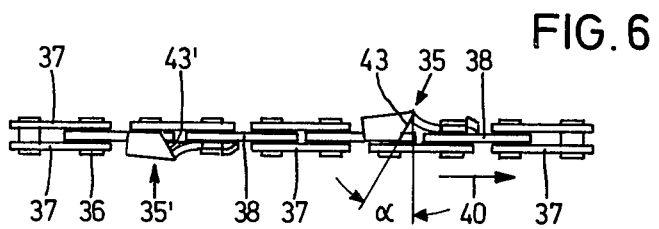
FIG. 6 is a top view of the saw chain of FIG. 5 viewed in the direction of the arrow VI in FIG. 5.
Figure 7:
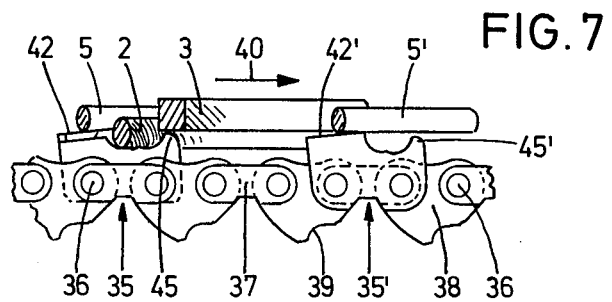
FIG. 7 is a view corresponding to FIG. 5 with the sharpener engaged in sectional representation.

The sharpener shown in the drawing has a frame 1 for holding and guiding a round file 2 having a circular cross-section and a square file 3. The frame 1 has two end-pieces 4,4' formed mirror-symmetrically with respect to one another and two circular-cylindrical guiding rods 5,5' connecting the end-pieces together in parallel, i.e. disposed in a common plane; the guiding rods 5,5' may also have a rectangular, and a particular quadratic, cross-section. Each of the end-pieces 4,4' is provided with a guiding housing 6,6' in each of which a respective guiding pusher 7,7' is disposed. As can be seen, in particular, from FIG. 1 in conjunction with FIG. 3, the guiding pushers 7,7' are substantially rectangular in shape and disposed, movably, in a recess of each guiding housing 6,6', at right angles to the longitudinal direction of the guiding rods 5,5' in the direction of the double directional arrow 8 in a manner which is to be described in detail below. Long holes 10,10' for one of the guiding rods, that is rod 5', further removed from the round file 2 and the square file 3 are formed in mutually facing side walls 9,9' of the guiding housing 6,6', these holes extending in direction 8. The guiding rod 5' extends through the long holes 10,10' and is anchored by its ends in the guiding pushers 7,7'. The ends of the long holes 10,10' simultaneously define the maximum displacement path of the guiding pushers 7,7' in the guiding housings 6,6'. The other guiding rod 5 is anchored in the vicinity of the opposite end of the guiding pusher 7,7' by its ends in the same manner. As the guiding pushers 7,7' generally are made of a hard-elastic thermoplastic substance and the guiding rods 5,5' generally of steel, this anchoring can be simply arranged by providing holes, smaller than the diameter of the guiding rods 5,5', in the guiding pushers, into which holes the latter are pressed in the process of assembly.

In the guiding pushers 7,7', recesses 11,11', are provided which serve to accommodate the corresponding ends of the square file 3 and are adapted, in their cross-section, to that of the latter. Therefore, in the example of embodiment illustrated, they have a quadratic cross-section, as can be seen from FIGS. 2 and 3. They extend longitudinally as far as the mutually adjacent side walls 9,9' and thence through a part of the guiding pusher 7,7', so that the square ends of file 3 abut against the mutually opposite ends of the recesses 11,11' and are thus held in the longitudinal direction. The recesses 11,11' are open, in the longitudinal extension, to each side wall 12,12' of the guiding housings 6,6' which are thus disposed at right angles to the side walls 9,9'. In each side wall 12,12', there is respectively disposed a slit 13,13' which is as wide as the square file 3 and also extends to the end of the recess 11,11'. It is thus disposed offset with respect to the guiding rod 5, so that the square file 3 lies in front of the slit 13,13' in the unlocked position (shown in FIG. 4 of the drawing) of the guiding pushers 7,7' in which the guiding rod 5' abuts against the other end of the long hole 10,10', so that the square file 3 can be removed from the frame 1 or introduced into the frame 1 through the slits. In the side walls 9,9', there are corresponding openings 14,14' which accommodate the corresponding parts of the square file 3 in their locked position illustrated in the drawing.

Facing the side walls 15,15' of the guiding housings 6,6' situated parallel to the side walls 12,12' and opposite the latter, recesses 16,16', running parallel to the recesses 11,11' are provided in the guiding pushers 7,7' which serve to accommodate ends of the round file 2. These recesses 16,16' are open towards the last-mentioned side walls 15,15' along their longitudinal extension. By contrast to the recesses 11,11', they extend in the longitudinal direction of the round file 2 over the entire width of the guiding pushers 7,7'. As can be seen from FIGS. 2 and 3, respective side walls 15,15', close the recesses 16,16' in the closed condition of the guiding pushers 7,7'; in the unlocked condition, the recesses 16,16' are free from the side wall 15,15', so that the round file 2 can also be inserted and removed laterally. For the axial fixation of the round file 2, the latter is provided, in the region of one end, a guiding ring 17, which is provided with a rotating cylindrical-annular guiding groove 18. The edge part 19,19' of an opening 20,20', which is formed in the side walls 21,21' facing away from each other, engages with the guiding groove 18, in the locked condition of the guiding pushers 7,7'. For the annular collar 22 of the guiding ring 17 facing the guiding pusher 7,7', a suitable recess 23,23' is provided in the latter. The other annular collar 24 of the guiding ring 17 lies outside against the corresponding side wall 21,21'. The guilding ring 17 can be made to be of a piece with a file handle 25 disposed on the same end of the round file 2.

The two guiding pushers 7,7' are supported in their guiding housings 6,6' and in fact on their side walls 12,12' and 15,15' situated parallel to the frame 1 by means of flat springs 26,26' and 27,27'. This ensures that the guiding pushers 7,7' are held and guided with sufficient firmness, but movably in their longitudinal direction in the guiding housings 6,6'. The flat springs 26,26' and 27,27' are secured, in the longitudinal direction, opposite the side wall 12,12' and 15,15' respectively and in fact by corresponding flanges 28 which reach over the assigned edges of the said side walls.

In order to keep the guiding pushers 7,7' still quite particularly in a defined manner in the predetermined end positions by a means other than the frictional forces exerted by the flat spring 26,26' and 27,27', a click-stop device 29,29' is provided in each guiding pusher 7,7'. In this arrangement, a stop ball 30,30' is provided in the known manner which is loaded by a pressure spring 32,32' disposed in a bore 31,31'. In the assigned flat spring 27,27', two recesses 33,33' and 34,34' marking and defining the end positions of the guiding pusher 7,7' are formed into which the stop ball 30,30' snaps in the corresponding end position. These recesses 33,33' and 34,34' can of course also be formed in the assigned side wall 15,15'.

The sharpener described above serves for grinding the cutting face and hence for sharpening the cutting edge of the cutting teeth of a saw chain for chain saws. The drawing shows part of such a saw chain, three-membered in the present case. In this arrangement, cutting teeth 35,35' formed mirror-symmetrically with respect to one another, i.e. cutting alternately to the left and to the right, are connected, always in an alternating pattern, by rivets 36 and standard chain members 37, to form a flexible chain in which a chain member pair 37 is always connected before or after a cutting tooth 35,35', which is only then followed by a further cutting tooth 35,35'. Connecting members 38 which are provided with a tooth 39 for engagement with the driving wheel of a chain saw are disposed centrally between the pair of chain members 37 and between one cutting tooth 35,35' and an assigned chain member 37.

The saw chain and hence the cutting teeth 35,35' are moved for cutting wood in cutting direction 40.

The cutter 43,43' formed by the line passing through cutting face 41,41' and free surface 42,42' displays a sharpening angle α of 30° to 35° with a line running at right angles to the cutting direction 40. Such a sharpening angle, not equal to 0 serves to produce a so-called "drawing" cut. The rake angle γ is 5° to 15°. The tooth front 44,44' is preceded in the cutting direction 40 by a depth limiter 45,45' which determines the depth of cut. The free surface 42,42' forms with the cutting direction 40 a clearance angle β of a few degrees, so that the free surface 42 is free from the wood to be cut behind the intersection with the cutter 43,43'.

The distance apart b of the centres of the two guiding rods 5,5' is equal to the division t of the cutting teeth 35,35', i.e. equal to the distance between the cutters 43,43' of two adjacent cutting teeth 35,35'. For sharpening a cutter 43,43', the sharpener is placed on the corresponding free surfaces 42,42' of two adjacent cutting teeth 35,35' with the two guiding rods 5,5', whereby the round file 2 moves against the tooth front 44,44' and hence also the cutting face 41,41' of the corresponding cutting tooth 35,35'. The allocation of the round file 2 to the guiding rods 5,5' is such that the round file lies accurately against the predetermined circular-segment shaped profile of the tooth front 44,44' to which the profile of the cutting face 41,41' also belongs. The arrangement is therefore such that the round file 2, lies against a place at which its angle of aperture at the point of contact with the cutter 43,43' corresponds to the rake angle γ. With increasing refiling of the cutting face 41,41', i.e. with the progressive sharpening of the cutter 43,43', the latter changes its position at right angles to the cutting direction 40 towards the chain members 37, as the free surfaces 42,42' are not disposed parallel, but at a clearance angle β to the cutting direction 40. However, the profile of the tooth front 44,44' and the cutting geometry, in particular the rake angle γ are maintained in this case.

Moreover, as the square file 3 has a position which is strictly predetermined and corresponds to the position of the depth limiter 45,45' with respect to the cutter 43,43', the depth limiter 45,45' is also constantly filed at the same time so that its arrangement with respect to the cutter 43,43' also remains constant. The depth of cut "a", i.e. the cutting thickness of the wood to be cut thus remains constant.

As can be seen from the drawings, the mutually opposite front edges 46,46' and 47,47' of the side walls 12,12' run at an angle α with respect to a line running at right angles to the guiding rods 5,5' so that the sharpening angle α is thereby maintained and the sharpener is guided in such a way that the corresponding front edges 46,46' and 47,47' abut totally or almost against the corresponding chain members 37 and the cutting teeth 35,35' respectively in each particular end position of the sharpener during the filing process. Very accurate guidance of the sharpener by hand at a sharpening angle α with respect to the cutting teeth 35,35' is thus possible.

In order, during the sharpening of the cutting teeth 35,35', always to work with the files 2,3 guided thereby, the files 2,3 can be removed from the frame 1 in the manner already described above, turned through 180° in their longitudinal direction and re-inserted and locked in.

What is claimed is:

1. In a sharpener for manual sharpening of cutting teeth of saw chains for chain saws, having a depth limiter disposed in front of a cutter in the cutting direction for controlling depth of cut, the cutter being defined by a line passing through a free surface forming the back of teeth to be sharpened and a cutting face situated on the front of the teeth; and a round file provided for sharpening the cutter by a cutting processing of the cutting face adapted to the tooth front with the cutting face in cross-section, an improvement comprising a guiding rod (5), which can be placed on a free surface (42) of a cutting tooth to be sharpened, a second guiding rod (5'), which can be placed on a free surface (42') of an adjacent cutting tooth (35') and a second file (3) which can be placed on said depth limiter (45) of said cutting tooth (35) to be sharpened disposed substantially in parallel to said round file (2), said two guiding rods (5,5'), said round file (2) and said second file (3) with respect to each other corresponding to the geometry of the cutting teeth.

2. A sharpener according to claim 1, including two end-pieces (4,4'), and wherein said two guiding rods (5,5') and said two end-pieces form a frame (1).

3. A sharpener according to claim 2, wherein said round file (2) and said second file (3) are mounted in said end-pieces (4,4') in such a way that they can be replaced.

4. A sharpener according to claim 3, wherein said end-pieces (4,4') are formed as snap-fasteners for said files.

5. A sharpener according to claim 4, wherein said end-pieces (4,4') are provided with a respective guiding housing (6,6'), a respective guiding pusher (7,7') accommodating each corresponding end of said round file (2) and being movable between two end positions, said ends of said round file (2) being free at one end position of said guiding housing (6,6') and held fast in the other end position.

6. A sharpener according to claim 1 or claim 2, wherein said end-pieces (4,4') are provided with a respective guiding housing (6,6'), a respective guiding pusher (7,7') accommodating each corresponding end of said round file (2) and being movable between two end positions, said ends of said round file being free at one end position of said guiding housing (6,6') and held fast in the other end position.

7. A sharpener according to claim 1 or claim 2 wherein said round file (2) is rotatably mounted.

8. A sharpener according to claim 2 or claim 3, wherein front edges (46,46', 47,47') are formed on the end-pieces at an angle to a line at right angles to the longitudinal direction of said guiding rods (5,5'), said angle being equal to the sharpening angle α of the cutting teeth (35,35').

9. A sharpener according to claim 1 or claim 2 wherein said second file (3) serving to file said depth limiter (45,45') is a substantially square file.

10. A sharpener according to claim 5, wherein said guiding pushers (7,7') are held elastically clamped in one end position by a click-stop lock (29,29').

11. A sharpener according to claim 2 or claim 3, wherein said end-pieces (4,4') are formed mirror-symmetrically.

12. A sharpener according to claim 5, wherein said guiding pushers (7,7') are made of plastic material.

13. A sharpener according to claim 2 or claim 3, wherein said end-pieces (4,4') are made of plastic material.

* * * * *